US012355191B2

(12) United States Patent
Amemori et al.

(10) Patent No.: US 12,355,191 B2
(45) Date of Patent: Jul. 8, 2025

(54) CONNECTOR

(71) Applicant: Murata Manufacturing Co., Ltd., Kyoto-fu (JP)

(72) Inventors: Yuma Amemori, Nagaokakyo (JP); Yuuto Morita, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 374 days.

(21) Appl. No.: 18/149,581

(22) Filed: Jan. 3, 2023

(65) Prior Publication Data

US 2023/0246389 A1 Aug. 3, 2023

(30) Foreign Application Priority Data

Jan. 31, 2022 (JP) ................................ 2022-012629

(51) Int. Cl.

| | |
|---|---|
| ***H01R 13/6471*** | (2011.01) |
| ***H01R 12/71*** | (2011.01) |
| ***H01R 13/03*** | (2006.01) |
| ***H01R 13/516*** | (2006.01) |

(52) U.S. Cl.

CPC ....... *H01R 13/6471* (2013.01); *H01R 12/716* (2013.01); *H01R 13/03* (2013.01); *H01R 13/516* (2013.01)

(58) Field of Classification Search

CPC ...... H01R 13/02; H01R 13/03; H01R 13/035; H01R 13/516; H01R 13/518; H01R 13/646; H01R 13/6461; H01R 13/6471; H01R 12/71; H01R 12/712; H01R 12/716

USPC ........................................................ 439/108

See application file for complete search history.

(56) References Cited

U.S. PATENT DOCUMENTS

2023/0246389 A1* 8/2023 Amemori .............. H01R 12/73 439/108
2025/0070518 A1* 2/2025 Ozeki ............... H01R 13/5213

FOREIGN PATENT DOCUMENTS

JP 2006-331679 A 12/2006

* cited by examiner

*Primary Examiner* — Khiem M Nguyen
(74) *Attorney, Agent, or Firm* — Studebaker Brackett PLLC

(57) ABSTRACT

A ground terminal includes a side portion having a side surface facing in a negative direction of a Y-axis, the side surface being exposed from a resin body member, a bottom portion having a bottom surface facing in a positive direction of a Z-axis, the bottom surface being exposed from the resin body member, a side metal film covering part of the side surface, and a bottom metal film covering part of the bottom surface. A region between both ends of the side metal film in an X-axis direction does not overlap, on an X-axis, a region between both ends of the bottom metal film in the X-axis direction. The side surface and the bottom surface are connected.

20 Claims, 14 Drawing Sheets

14l

CONNECTOR

CROSS-REFERENCE TO RELATED APPLICATION

This application claims benefit of priority to Japanese Patent Application No. 2022-012629, filed Jan. 31, 2022, the entire content of which is incorporated herein by reference.

BACKGROUND

Technical Field

The present disclosure relates to a connector.

Background Art

For example, a plug connector described in Japanese Unexamined Patent Application Publication No. 2006-331679 is known as an disclosure related to an existing connector. The plug connector includes a plug housing, a plurality of plug contacts, and a plug member. The plug housing is a resin member. Each of the plurality of plug contacts is a signal terminal. The plurality of plug contacts is supported by the plug housing. The plug member is a ground terminal. The plug member is supported by the plug housing. The plug member has a plug soldering portion. The plug soldering portion is connected to a substrate by solder.

Incidentally, it is desired that the plug connector described in Japanese Unexamined Patent Application Publication No. 2006-331679 be configured as a low profile.

SUMMARY

The present disclosure provides a connector that can be configured as a low profile.

A connector according to an aspect of the present disclosure includes a resin body member, a signal terminal supported by the resin body member, and a ground terminal supported by the resin body member. The ground terminal includes a side portion having a side surface facing in a negative direction of a Y-axis, the side surface being exposed from the resin body member, a bottom portion having a bottom surface facing in a positive direction of a Z-axis, the bottom surface being exposed from the resin body member, a side metal film covering part of the side surface, and a bottom metal film covering part of the bottom surface. A region between both ends of the side metal film in an X-axis direction does not overlap, on an X-axis, a region between both ends of the bottom metal film in the X-axis direction. The side surface and the bottom surface are connected.

Hereinafter, a positional relationship among members in the specification will be defined. A first member to a third member are components of a connector set. In the specification, the first member and the second member arranged in a front and rear direction represent the following state. This is a state where, when the first member and the second member are viewed in a direction perpendicular to the front and rear direction, both the first member and the second member are disposed on a selected straight line representing the front and rear direction. In the specification, the first member and the second member arranged in the front and rear direction when viewed in an up and down direction represent the following state. When the first member and the second member are viewed in the up and down direction, both the first member and the second member are disposed on a selected straight line representing the front and rear direction. In this case, when the first member and the second member are viewed in a right and left direction different from the up and down direction, any one of the first member and the second member does not need to be disposed on a selected straight line representing the front and rear direction. The first member and the second member may be in contact with each other. The first member and the second member may be separated from each other. The third member may be present between the first member and the second member. This definition also applies to directions other than the front and rear direction.

In the specification, a state where the first member is disposed on or over the second member means the following state. At least part of the first member is located just on or over the second member. Therefore, when viewed in the up and down direction, the first member overlaps the second member. This definition also applies to directions other than the up and down direction.

In the specification, a state where the first member is disposed on or above the second member includes a case where at least part of the first member is located just on or over the second member and a case where the first member is not located just on or over the second member and the first member is located obliquely above the second member. In this case, when viewed in the up and down direction, the first member does not need to overlap the second member. The term "obliquely above" includes, for example, upper left and upper right. This definition also applies to directions other than the up and down direction.

In the specification, unless otherwise specified, parts of the first member are defined as follows. A front part of the first member means a front half of the first member. A rear part of the first member means a rear half of the first member. A left part of the first member means a left half of the first member. A right part of the first member means a right half of the first member. An upper part of the first member means an upper half of the first member. A lower part of the first member means a lower half of the first member. A front end of the first member means a forward end of the first member. A rear end of the first member means a rearward end of the first member. A left end of the first member means a leftward end of the first member. A right end of the first member means a rightward end of the first member. An upper end of the first member means an upward end of the first member. A lower end of the first member means a downward end of the first member. A front end part of the first member means the front end of the first member and its neighborhood. A rear end part of the first member means the rear end of the first member and its neighborhood. A left end part of the first member means the left end of the first member and its neighborhood. A right end part of the first member means the right end of the first member and its neighborhood. An upper end part of the first member means the upper end of the first member and its neighborhood. A lower end part of the first member means the lower end of the first member and its neighborhood.

When selected two members in the specification are defined as the first member and the second member, the relationship between the selected two members means as follows. In the specification, a state where the first member is supported by the second member includes a case where the first member is attached to (that is, fixed to) the second member so as to be not movable with respect to the second member and a case where the first member is attached to the second member so as to be movable with respect to the second member. A state where the first member is supported by the second member includes both a case where the first member is directly attached to the second member and a case where the first member is attached to the second member via the third member.

In the specification, a state where the first member is held by the second member includes a case where the first member is attached to (that is, fixed to) the second member so as to be not movable with respect to the second member and does not include a case where the first member is attached to the second member so as to be movable with respect to the second member. A state where the first member is held by the second member includes both a case where the first member is directly attached to the second member and a case where the first member is attached to the second member via the third member.

In the specification, the phrase "the first member and the second member are electrically connected" means that the first member and the second member are electrically continuous. Therefore, the first member and the second member may be in contact with each other or the first member and the second member do not need to be in contact with each other. When the first member and the second member are not in contact with each other, the third member having electrical conductivity is disposed between the first member and the second member.

In the specification, a state where wettability of solder on the surface of the first member is higher than wettability of solder on the surface of the second member means as follows. A part where the surface of the first member and the surface of solder contact with each other is defined as a first contact part. At the first contact part, an angle formed between the surface of solder and the surface of the first member is defined as a first contact angle. A part where the surface of the second member and the surface of solder contact with each other is defined as a second contact part. At the second contact part, an angle formed between the surface of solder and the surface of the second member is defined as a second contact angle. At this time, when the first contact angle is smaller than the second contact angle, wettability of solder on the surface of the first member is higher than wettability of solder on the surface of the second member. On the other hand, when the first contact angle is larger than the second contact angle, wettability of solder on the surface of the first member is higher than wettability of solder on the surface of the second member.

DETAILED DESCRIPTION

Figure 1:
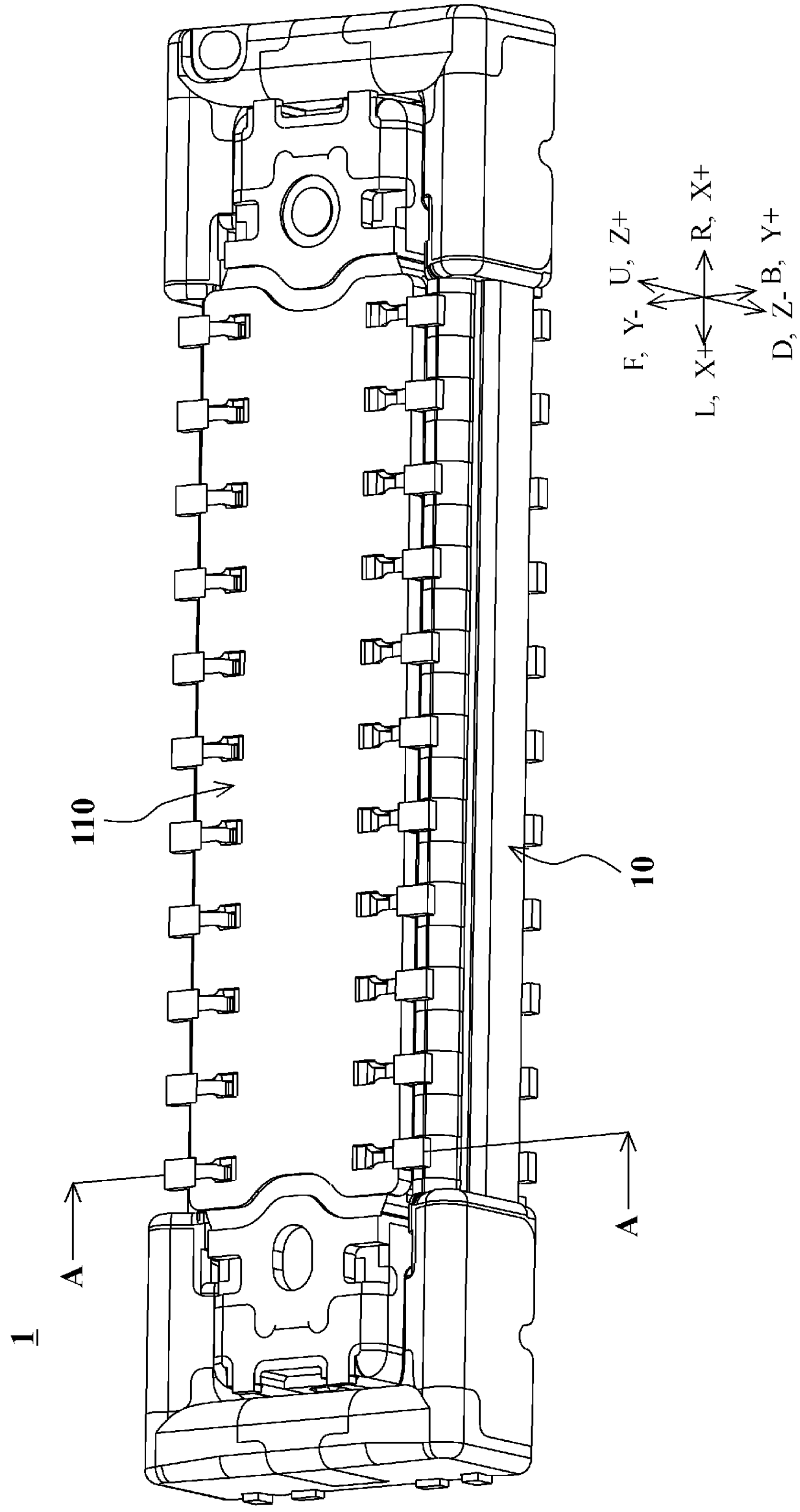
FIG. 1 is a perspective view of a connector set.

Hereinafter, a connector set 1 including a first connector 10 according to an embodiment of the present disclosure will be described. FIG. 1 is a perspective view of the connector set 1.

In the following description, as shown in FIG. 1, a direction in which a second connector 110 and the first connector 10 are arranged is defined as an up and down direction. A direction in which signal terminals 13*a* to 13*v* are arranged in the first connector 10 is defined as a right and left direction. The right and left direction is orthogonal to the up and down direction. A direction orthogonal to the right and left direction and the up and down direction is defined as a front and rear direction. However, the up and down direction, the right and left direction, and the front and rear direction in the specification are directions defined for the sake of convenience of description and do not need to coincide with an up and down direction, a right and left direction, and a front and rear direction during use of the connector set 1.

In the present embodiment, directions are defined as follows. As shown in FIG. 1, a direction that coincides with the up and down direction is defined as a Z-axis direction. A direction that coincides with an upward direction is defined as a positive direction of a Z-axis. A direction that coincides with a downward direction is defined as a negative direction of the Z-axis. A direction that coincides with the right and left direction is defined as an X-axis direction. A direction that coincides with a rightward direction is defined as a positive direction of an X-axis. A direction that coincides with a leftward direction is defined as a negative direction of the X-axis. A direction that coincides with the front and rear direction is defined as a Y-axis direction. A direction that coincides with a forward direction is defined as a negative direction of a Y-axis. A direction that coincides with a rearward direction is defined as a positive direction of the Y-axis. However, the X-axis direction, the Y-axis direction, and the Z-axis direction in the specification are directions defined for the sake of convenience of description and do not need to coincide with the X-axis direction, the Y-axis direction, and the Z-axis direction during use of the connector set 1.

The connector set 1 is, for example, used to connect two circuit boards. The connector set 1 includes the first connector 10 and the second connector 110. When the first connector 10 and the second connector 110 are connected, the second connector 110 is located on or over the first connector 10.

Structure of First Connector

Figure 2:
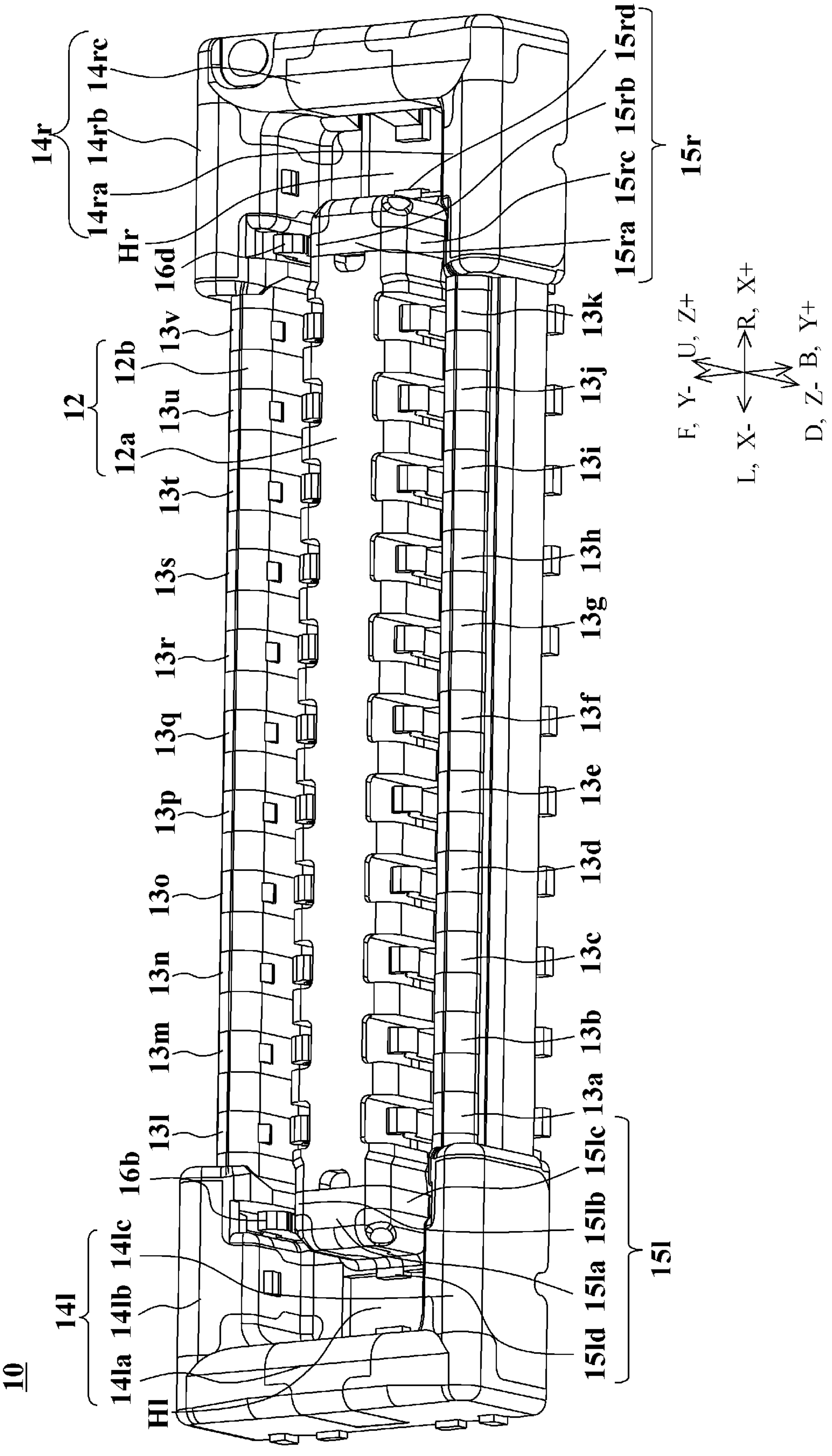
FIG. 2 is a perspective view of a first connector.
Figure 3:
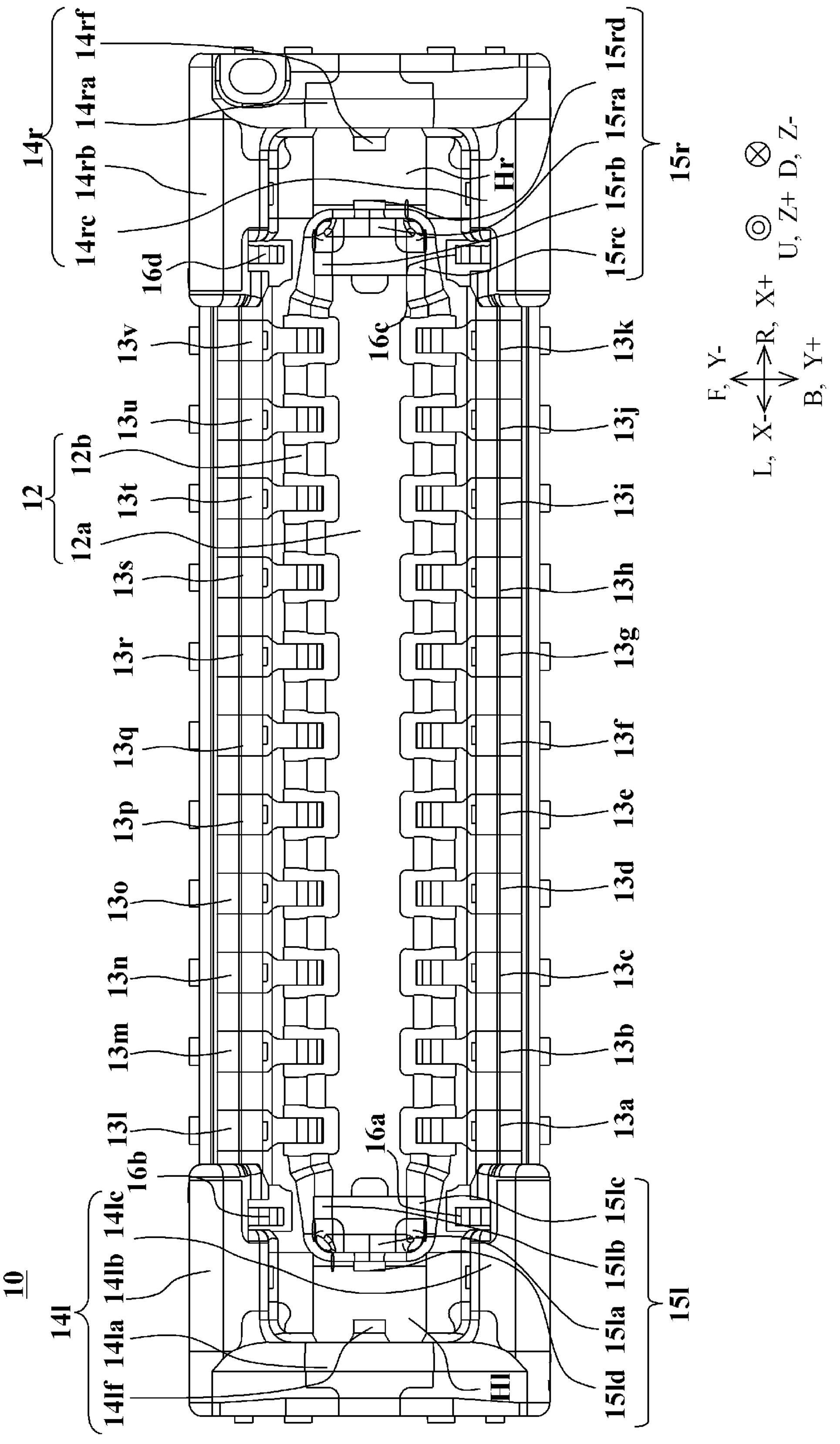
FIG. 3 is a top view of the first connector.
Figure 4:
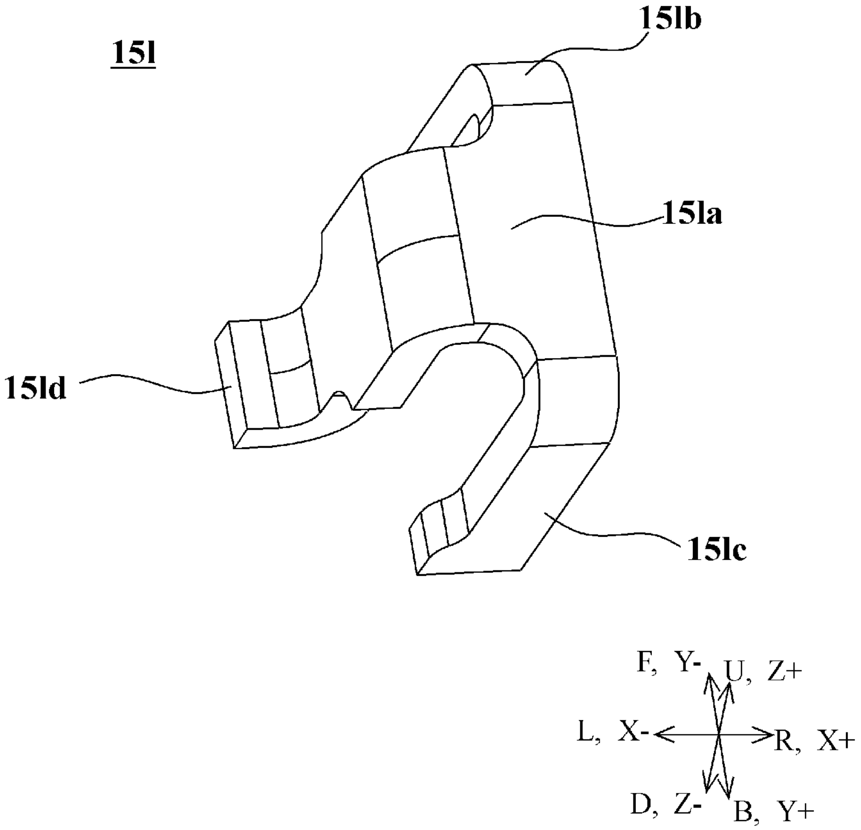
FIG. 4 is a perspective view of a floating terminal.
Figure 5:
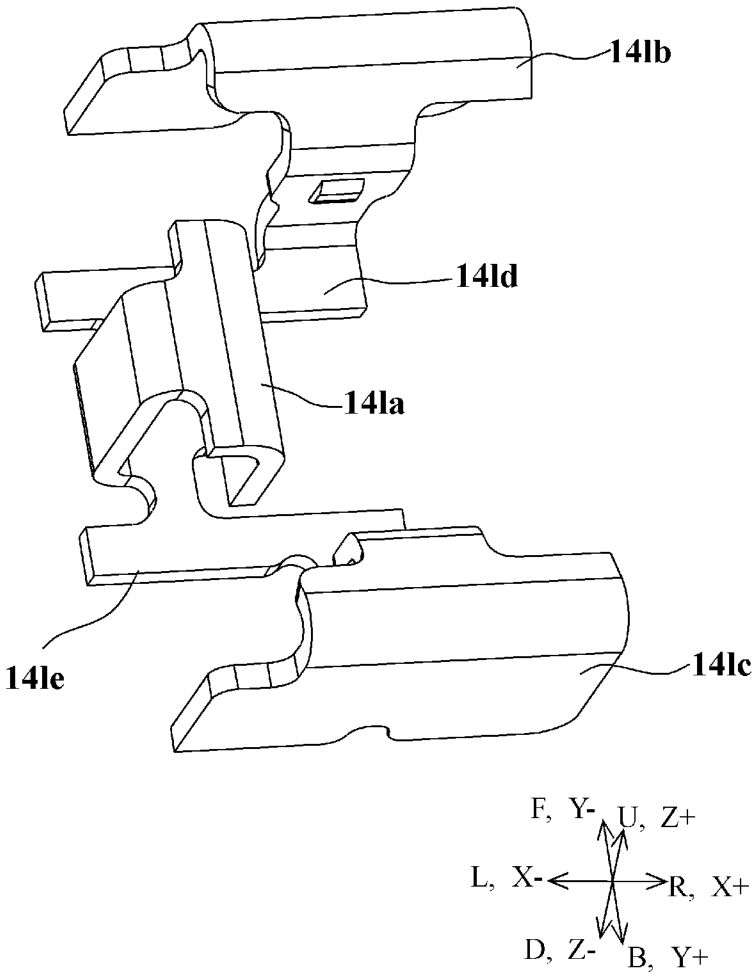
FIG. 5 is a perspective view of a ground terminal.
Figure 6:
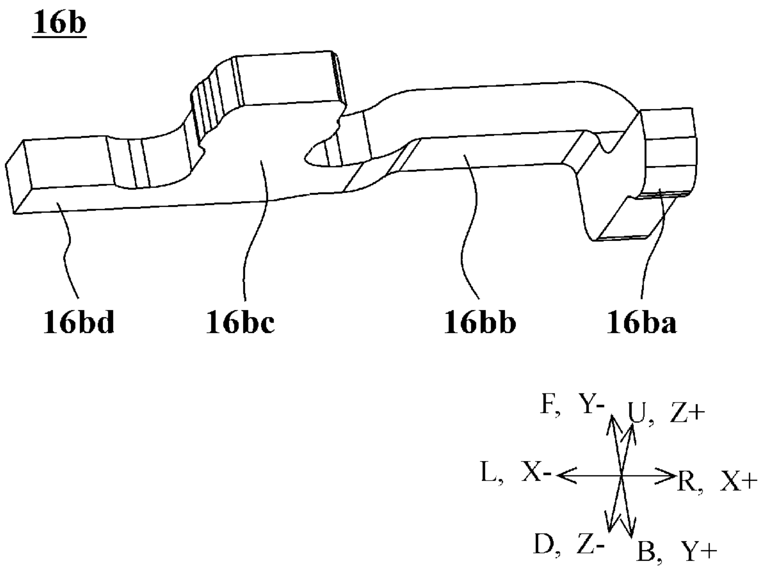
FIG. 6 is a perspective view of a ground terminal.

Next, the structure of the first connector 10 will be described. FIG. 2 is a perspective view of the first connector 10. FIG. 3 is a top view of the first connector 10. FIG. 4 is a perspective view of a floating terminal 151. FIG. 5 is a perspective view of a ground terminal 141. FIG. 6 is a perspective view of a ground terminal 16*b*.

As shown in FIGS. 2 and 3, the first connector 10 includes a resin body member 12, signal terminals 13*a* to 13*v*, ground terminals 141, 14*r*, floating terminals 151, 15*r*, and ground terminals 16*a* to 16*d*.

As shown in FIG. 2, the resin body member 12 includes a protruding portion 12*a*, a frame portion 12*b*, and a coupling portion 12*c* (see FIG. 3). When viewed in the up and down direction, the protruding portion 12*a* extends in the right and left direction. More specifically, the protruding portion 12*a* has a rectangular parallelepiped shape. When viewed in the up and down direction, the protruding portion 12*a* has two long sides extending in the right and left direction and two short sides extending in the front and rear direction.

When viewed in the up and down direction, the frame portion 12*b* has an annular shape surrounding the protruding portion 12*a*. More specifically, when viewed in the up and down direction, the frame portion 12*b* has a rectangular outer edge and a rectangular inner edge. When viewed in the up and down direction, each of the outer edge of the frame portion 12*b* and the inner edge of the frame portion 12*b* has two long sides extending in the right and left direction and two short sides extending in the front and rear direction. When viewed in the up and down direction, the protruding portion 12*a* is located in a region surrounded by the inner edge of the frame portion 12*b*. The protruding portion 12*a* is not in contact with the frame portion 12*b*.

As shown in FIG. 3, when viewed in the up and down direction, the coupling portion 12*c* is located between the protruding portion 12*a* and the frame portion 12*b* and couples the protruding portion 12*a* to the frame portion 12*b*. In the present embodiment, the coupling portion 12*c* couples the lower part of the protruding portion 12*a* to the lower part of the frame portion 12*b*. The material of the resin body member 12 is an electrically insulating material. The material of the resin body member 12 is, for example, a resin.

A radio-frequency signal is input to and output from each of the signal terminals 13*a* to 13*v*. The signal terminals 13*a* to 13*v* are supported by the resin body member 12. More specifically, part of each of the signal terminals 13*a* to 13*k* is embedded in the rear side of the frame portion 12*b*. Thus, the signal terminals 13*a* to 13*k* are supported by the frame portion 12*b* so as to be arranged in the right and left direction in a region in back of the protruding portion 12*a*. The signal terminals 13*a* to 13*k* are arranged in a line in this order from the left to the right. Part of each of the signal terminals 131 to 13*v* is embedded in the front side of the frame portion 12*b*. The signal terminals 131 to 13*v* are supported by the frame portion 12*b* so as to be arranged in the right and left direction in a region in front of the protruding portion 12*a*. The signal terminals 131 to 13*v* are respectively located in front of the signal terminals 13*a* to 13*k*. The signal terminals 131 to 13*v* are arranged in a line in this order from the left to the right. Each of the signal terminals 13*a* to 13*k* is manufactured by bending a rod metal member. The material of the signal terminals 13*a* to 13*k* is, for example, a copper-based material, such as phosphor bronze.

The floating terminal 151 is not connected to any of the terminals of the first connector 10, including the signal terminals 13*a* to 13*v* and the ground terminals 141, 14*r* (details will be described later). Therefore, the potential of the floating terminal 151 is a floating potential. The floating terminal 151 is supported by the resin body member 12. As shown in FIGS. 2 and 3, when viewed in the up and down direction, the floating terminal 151 covers at least part of the left end of the protruding portion 12*a*. As shown in FIG. 4, the floating terminal 151 includes a first part 15*la*, a second part 15*lb*, a third part 15*lc*, and a floating protrusion 15*ld*. The first part 15*la* covers part of the left end of the top surface of the protruding portion 12*a* and part of the left surface of the protruding portion 12*a*. The second part 15*lb* extends in the forward direction from the first part 15*la*. The second part 15*lb* covers part of the left end of the front surface of the protruding portion 12*a*. The third part 15*lc* extends in the rearward direction from the first part 15*la*. The third part 15*lc* covers part of the left end of the rear surface of the protruding portion 12*a*. The floating protrusion 15*ld* extends in the leftward direction from the lower end of the first part 15*la*. The floating terminal 151 is manufactured by bending a metal member. The material of the floating terminal 151 is, for example, a copper-based material, such as phosphor bronze. The structure of the floating terminal 15*r* and the structure of the floating terminal 151 are bilaterally symmetrical, so the description of the structure of the floating terminal 15*r* is omitted.

The ground terminal 141 is connected to a ground potential. The ground terminal 141 is supported by the resin body member 12. Specifically, the ground terminal 141 is supported by the frame portion 12*b* so as to be opposed to the floating terminal 151 in the front and rear direction and in the right and left direction. Hereinafter, the structure of the ground terminal 141 will be described.

As shown in FIG. 5, the ground terminal 141 includes a first part 14*la*, a second part 14*lb*, a third part 14*lc*, connecting parts 14*ld*, 14*le*, and a ground protrusion 14*lf* (see FIGS. 2 and 3). The first part 14*la* is provided on the left surface, the top surface, and the right surface of the left side of the frame portion 12*b*. As shown in FIG. 2, part of the first part 14*la* is embedded in the left side of the frame portion 12*b*. Thus, the first part 14*la* is opposed to the floating terminal 151 in the right and left direction. The second part 14*lb* is provided on the front surface, the top surface, and the rear surface of the left end of the front side of the frame portion 12*b*. Part of the second part 14*lb* is embedded in the front side of the frame portion 12*b*. Thus, the second part 14*lb* is opposed to the floating terminal 151 in the front and rear direction. The third part 14*lc* is provided on the front surface, the top surface, and the rear surface of the left end of the rear side of the frame portion 12*b*. Part of the third part 14*lc* is embedded in the rear side of the frame portion 12*b*. Thus, the third part 14*lc* is opposed to the floating terminal 151 in the front and rear direction.

The connecting part 14*ld* couples the first part 14*la* to the second part 14*lb*. The connecting part 14*le* couples the first part 14*la* to the third part 14*lc*. The ground protrusion 14*lf* extends in the rightward direction from the lower end of the first part 14*la*. The ground terminal 141 is manufactured by bending a metal member. The material of the ground terminal 141 is, for example, a copper-based material, such as phosphor bronze. The structure of the ground terminal 14*r* and the structure of the ground terminal 141 are bilaterally symmetrical, so the description of the structure of the ground terminal 14*r* is omitted.

The ground terminal 16*b* is connected to a ground potential. The ground terminal 16*b* is supported by the resin body member 12. In the present embodiment, the ground terminal 16*b* is supported by the left front part of the resin body member 12. As shown in FIG. 6, the ground terminal 16*b* includes a contact part 16*ba*, a spring part 16*bb*, a fixing part 16*bc*, and an external connecting part 16*bd*. The spring part 16*bb*, the fixing part 16*bc*, and the external connecting part 16*bd* are arranged in this order from the right to the left. The external connecting part 16*bd* is a part to which solder is applied when the first connector 10 is mounted on the circuit board. The fixing part 16*bc* is embedded in the resin body member 12.

The spring part 16*bb* is not supported by the resin body member 12. Therefore, the spring part 16*bb* is elastically deformable so as to deflect in the front and rear direction. The contact part 16*ba* extends in the rearward direction from the right end of the spring part 16*bb*. The ground terminal 16*b* is manufactured by bending a metal member. The material of the ground terminal 16*b* is, for example, a copper-based material, such as phosphor bronze. The structure of the ground terminal 16*a* and the structure of the ground terminal 16*b* are symmetrical in the front and back, so the description of the structure of the ground terminal 16*a* is omitted. The structure of the ground terminal 16*d* and the structure of the ground terminal 16*b* are bilaterally symmetrical, so the description of the structure of the ground terminal 16*d* is omitted. The structure of the ground terminal 16*c* and the structure of the ground terminal 16*a* are bilaterally symmetrical, so the description of the structure of the ground terminal 16*c* is omitted.

As shown in FIG. 3, in the first connector 10 as described above, when viewed in the up and down direction, a through-hole Hl extending through the coupling portion 12*c* in the up and down direction is provided in at least part of a region between the first part 14*la* and the floating terminal 151. When viewed in the up and down direction, the ground protrusion 14*lf* protrudes into the through-hole Hl. When viewed in the up and down direction, the floating protrusion 15*ld* protrudes into the through-hole Hl. The ground protrusion 14*lf* and the floating protrusion 15*ld* are arranged in the right and left direction. The structure of a through-hole Hr and the structure of the through-hole Hl are bilaterally symmetrical, so the description of the structure of the through-hole Hr is omitted.

The first connector 10 as described above is mounted on the circuit board. At this time, parts of the signal terminals 13*a* to 13*v*, ground terminals 141, 14*r*, floating terminals 151, 15*r*, and ground terminals 16*a* to 16*d* are exposed from the bottom surface of the resin body member 12. Solder is applied to each of these parts. Thus, the signal terminals 13*a* to 13*v*, the ground terminals 141, 14*r*, the floating terminals 151, 15*r*, and the ground terminals 16*a* to 16*d* are respectively connected to the electrodes of the circuit board.

Structure of Second Connector

Figure 7:
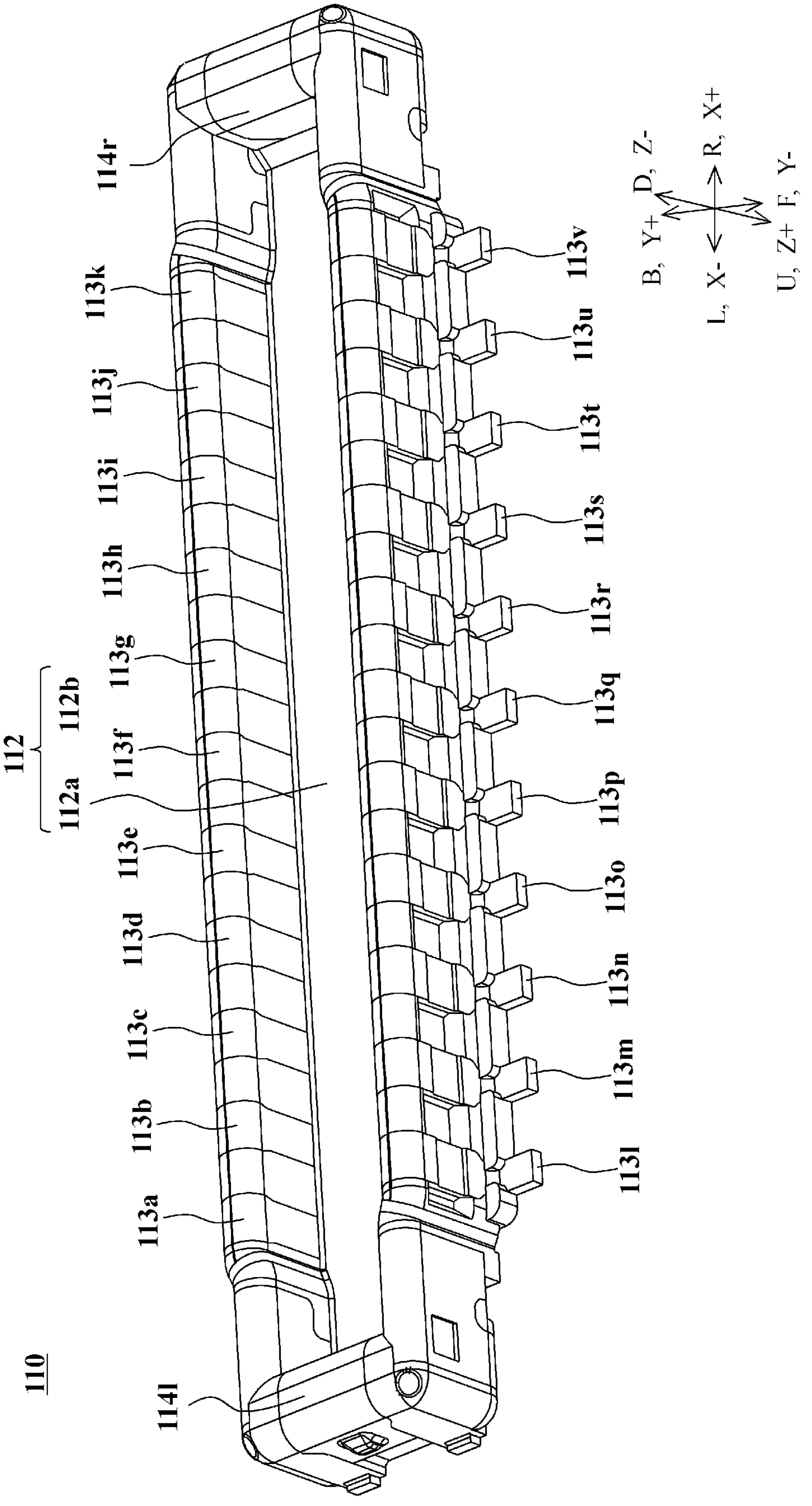
FIG. 7 is a perspective view of a second connector.
Figure 8:
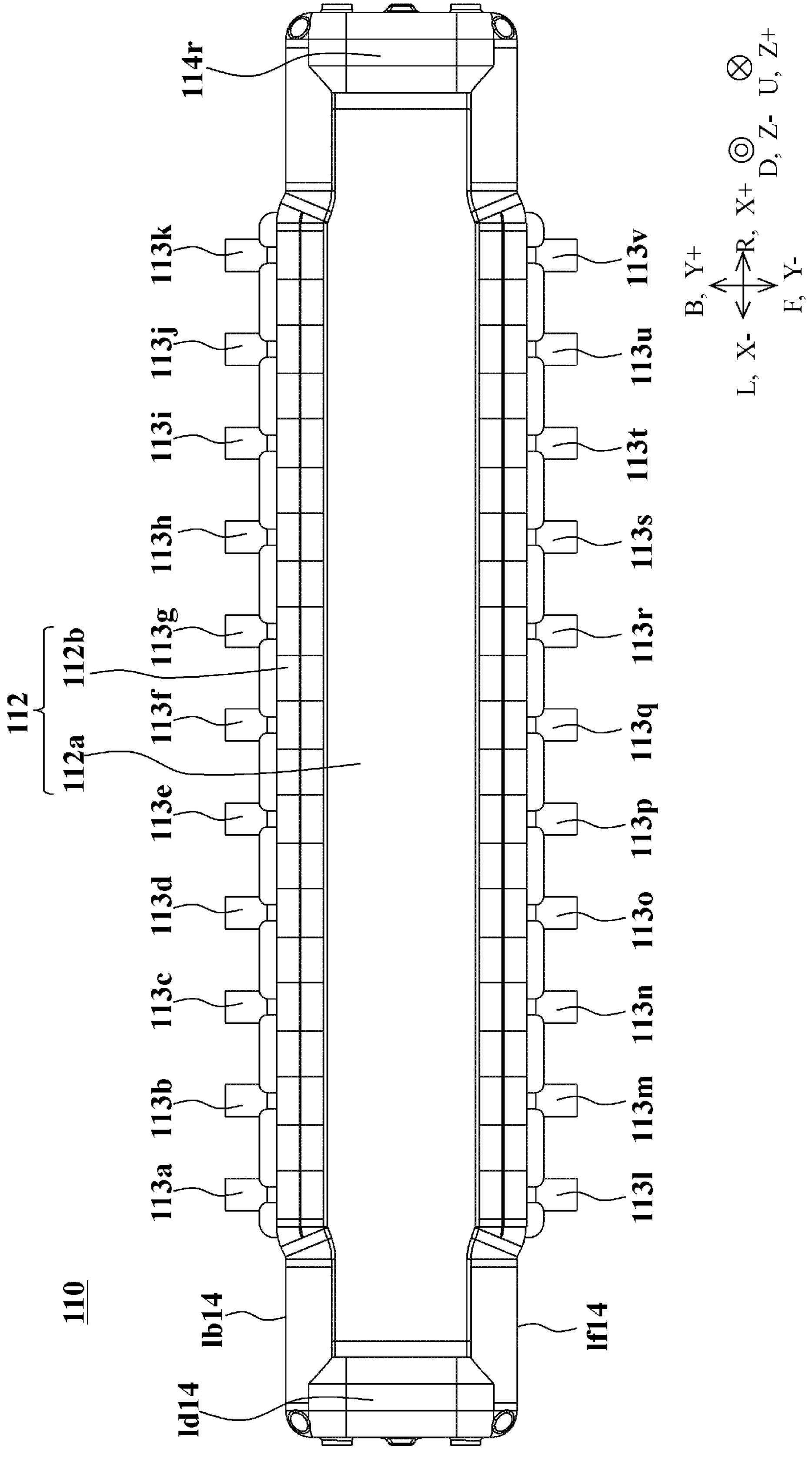
FIG. 8 is a top view of the second connector.
Figure 9:
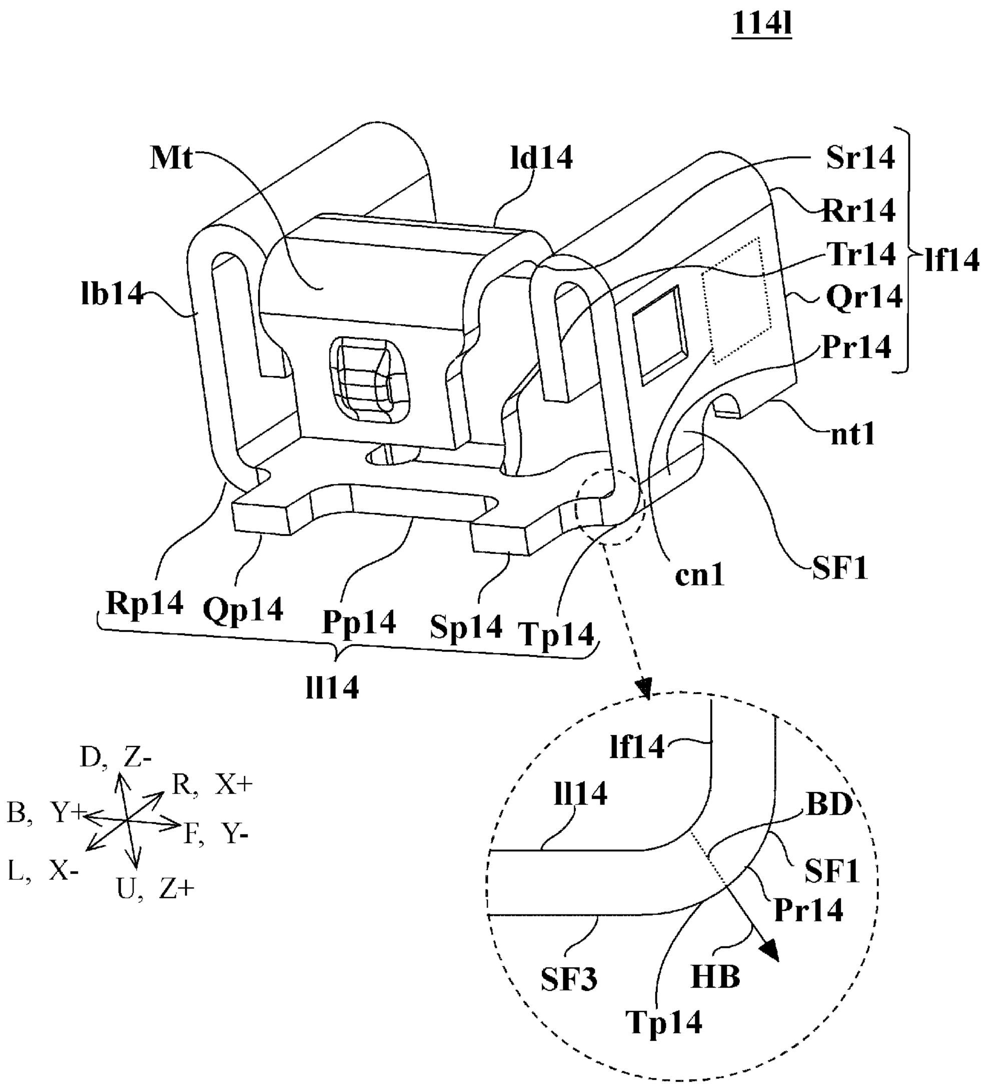
FIG. 9 is a perspective view of a ground terminal.
Figure 10:
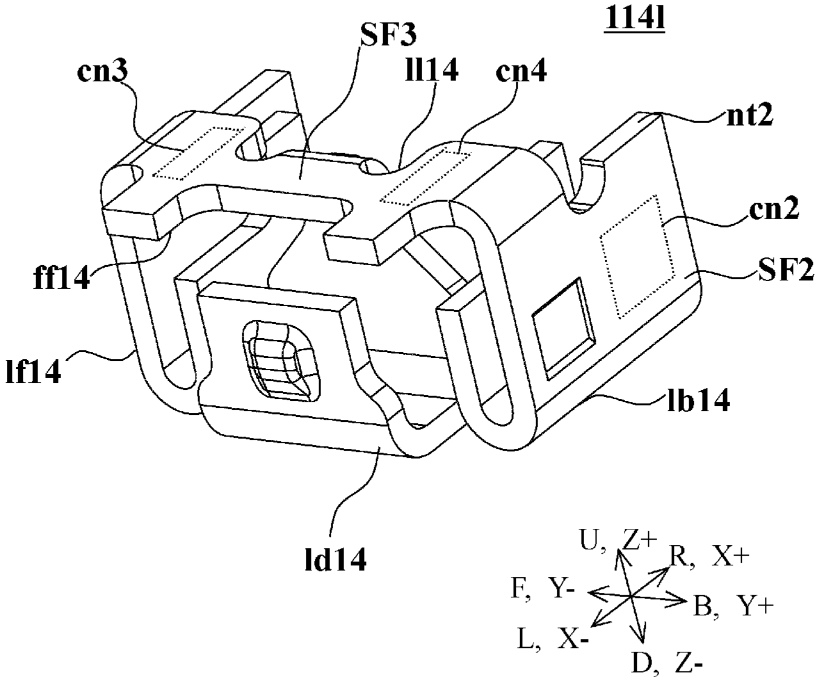
FIG. 10 is a perspective view of the ground terminal and is a view in a direction different from that of FIG. 9.
Figure 11:
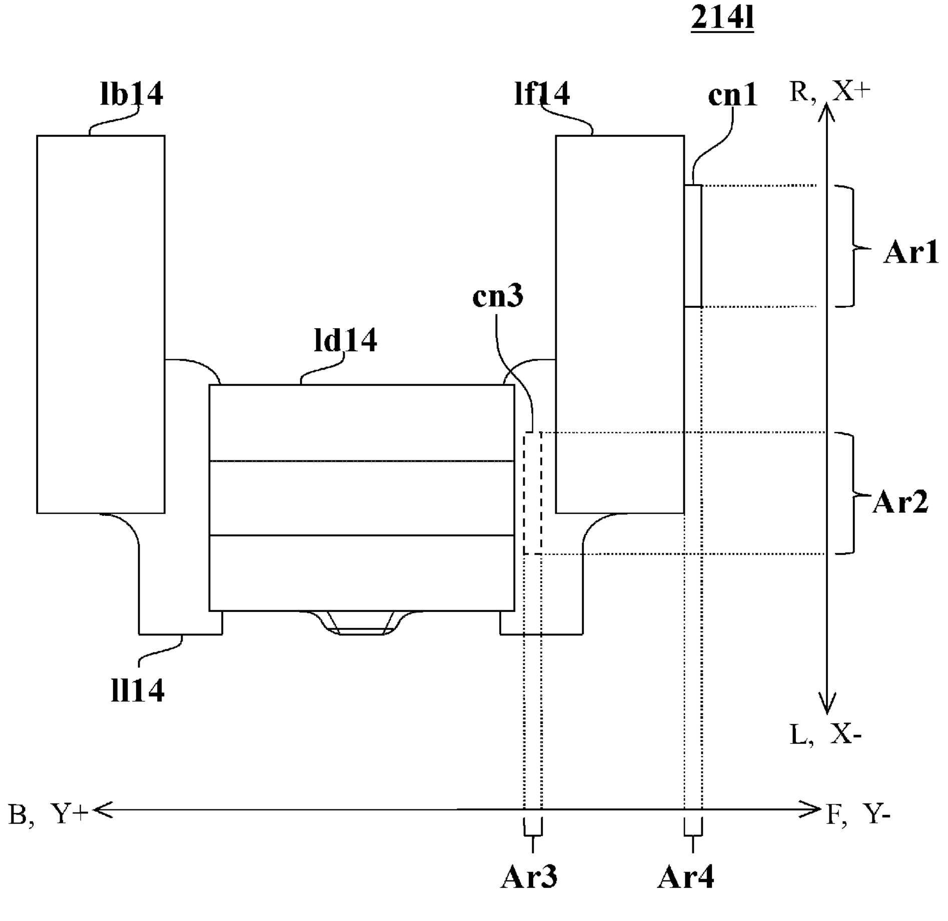
FIG. 11 is a bottom view of the ground terminal.
Figure 11:
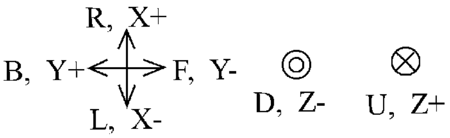
Figure 12:
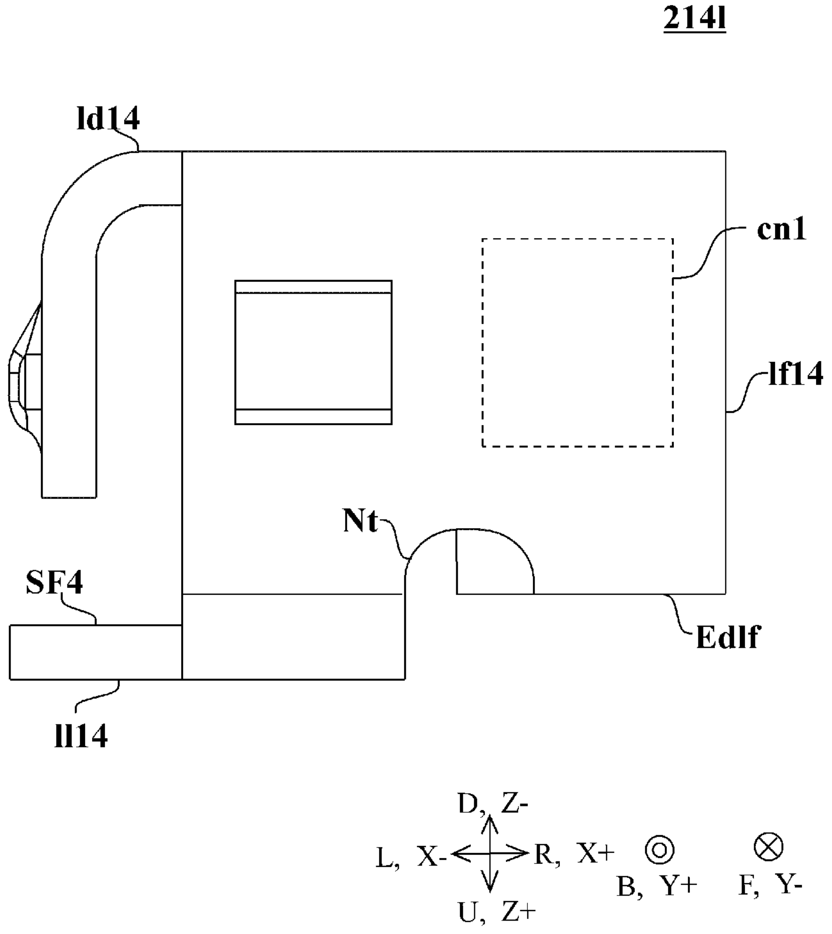
FIG. 12 is a side view of the ground terminal.

Next, the structure of the second connector 110 will be described. FIG. 7 is a perspective view of the second connector 110. FIG. 8 is a top view of the second connector 110. FIG. 9 is a perspective view of a ground terminal 114*l*. FIG. 10 is a perspective view of the ground terminal 114*l* and is a view in a direction different from that of FIG. 9. FIG. 11 is a bottom view of the ground terminal 114*l*. FIG. 12 is a side view of the ground terminal 114*l*.

As shown in FIG. 7, the second connector 110 includes a resin body member 112, signal terminals 113*a* to 113*v*, and ground terminals 114*l*, 114*r*.

The resin body member 112 includes a bottom portion 112*a* and a frame portion 112*b*. When viewed in the up and down direction, the frame portion 112*b* has an annular shape. More specifically, when viewed in the up and down direction, the frame portion 112*b* has a rectangular outer edge and a rectangular inner edge. When viewed in the up and down direction, each of the outer edge of the frame portion 112*b* and the inner edge of the frame portion 112*b* has two long sides extending in the right and left direction and two short sides extending in the front and rear direction. When viewed in the up and down direction, the bottom portion 112*a* closes part of the end surface of a region, in the up and down direction, surrounded by the frame portion 112*b*. As shown in FIGS. 7 and 8, when viewed in the up and down direction, the bottom portion 112*a* closes the top surface of a region surrounded by the frame portion 112*b*. The material of the resin body member 112 is an electrically insulating material. The material of the resin body member 112 is, for example, a resin.

A radio-frequency signal is input to and output from each of the signal terminals 113*a* to 113*v*. The signal terminals 113*a* to 113*v* are supported by the resin body member 112. More specifically, part of each of the signal terminals 113*a* to 113*k* is embedded in the rear side of the frame portion 112*b*. The signal terminals 113*a* to 113*k* are arranged in a line in this order from the left to the right. Part of each of the signal terminals 1131 to 113*v* is embedded in the front side of the frame portion 112*b*. The signal terminals 1131 to 113*v* are respectively located in front of the signal terminals 113*a* to 113*k*. The signal terminals 1131 to 113*v* are arranged in a line in this order from the left to the right. Each of the signal terminals 113*a* to 113*k* is manufactured by bending a rod metal member. The material of the signal terminals 113*a* to 113*k* is, for example, a copper-based material, such as phosphor bronze.

The ground terminal 114*l* is connected to a ground potential. The ground terminal 114*l* is supported by the resin body member 112. Part of the ground terminal 114*l* is embedded in the left end of the front side of the frame portion 112*b*, the left end of the rear side of the frame portion 112*b*, and the left side of the frame portion 112*b*. Part of the ground terminal 114*l* is exposed from the resin body member 112. The ground terminal 114*l* is manufactured by bending a metal member. The material of the metal member is, for example, a copper-based material, such as phosphor bronze. The surface of the metal member is coated with metal plating. The metal plating covers the entire surface of the ground terminal 114*l*. In this case, the surface of the ground terminal 114*l* is a surface coated with metal plating. The material of the metal plating is, for example, a metal material, such as nickel (Ni).

As shown in FIG. 9, the ground terminal 114*l* includes a bottom portion 1114, a first side portion lf14, a second side portion lb14, a center portion ld14, side metal films cn1, cn2, and bottom metal films cn3, cn4.

The bottom portion 1114 is provided on the top surface of the left side of the frame portion 112*b*. Part of the bottom portion 1114 is embedded in the left side of the frame portion 112*b*. Part of the bottom portion 1114 is exposed from the resin body member 112. Specifically, the bottom portion 1114 has a bottom surface SF3. The bottom surface SF3 is exposed from the resin body member 112. The bottom surface SF3 is exposed from the top surface of the resin body member 112. The bottom surface SF3 faces in the upward direction. Therefore, in the present embodiment, the bottom surface SF3 faces in the positive direction of the Z-axis. The bottom portion 1114 has a top surface SF4 facing in the negative direction of the Z-axis.

The bottom portion 1114 has a bottom portion first part Pp14, a bottom portion second part Qp14, a bottom portion third part Rp14, a bottom portion fourth part Sp14, and a bottom portion fifth part Tp14. The bottom portion third part Rp14, the bottom portion second part Qp14, the bottom portion first part Pp14, the bottom portion fourth part Sp14, and the bottom portion fifth part Tp14 are arranged in this order in the forward direction.

The bottom portion first part Pp14 has a rectangular shape extending in the front and rear direction. The bottom portion second part Qp14 connects with the rear end of the bottom portion first part Pp14. The bottom portion second part Qp14 has a rectangular shape extending in the right and left direction. The bottom portion third part Rp14 bends in the downward direction from the rear end of the bottom portion second part Qp14. The bottom portion fourth part Sp14 connects with the front end of the bottom portion first part Pp14. The bottom portion fourth part Sp14 has a rectangular shape extending in the right and left direction. The bottom portion fifth part Tp14 bends in the downward direction from the front end of the bottom portion fourth part Sp14.

A first side portion lf14 is provided on the top surface, the front surface, and the rear surface of the left end of the front side of the frame portion 112*b*. Part of the first side portion lf14 is embedded in the front side of the frame portion 112*b*. Part of the first side portion lf14 is exposed from the resin body member 112. Specifically, the first side portion lf14 has a side surface SF1. The side surface SF1 is exposed from the resin body member 112. The side surface SF1 is exposed from the front surface of the resin body member 112. The side surface SF1 faces in the forward direction. Therefore, in the present embodiment, the side surface SF1 faces in the negative direction of the Y-axis.

The first side portion lf14 has a first side portion first part Pr14, a first side portion second part Qr14, a first side portion third part Rr14, a first side portion fourth part Sr14, and a first side portion fifth part Tr14. The first side portion first part Pr14 bends in the upward direction from the front end of the bottom portion fifth part Tp14. Therefore, the side surface SF1 and the bottom surface SF3 are connected. The first side portion second part Qr14 extends in the downward direction from the lower end of the first side portion first part Pr14. The first side portion third part Rr14 bends in the rearward direction from the lower end of the first side portion first part Qr14. The first side portion fourth part Sr14 bends in the downward direction from the back end of the first side portion third part Rr14. The first side portion fifth part Tr14 extends in the downward direction from the upper end of the first side portion fourth part Sr14.

A second side portion lb14 is provided on the top surface, the front surface, and the rear surface of the left end of the rear side of the frame portion 112*b*. Part of the second side portion lb14 is embedded in the rear side of the frame portion 112*b*. The second side portion lb14 has a side surface SF2. The side surface SF2 is exposed from the resin body member 112. The side surface SF2 is exposed from the rear surface of the resin body member 112. The second side portion lb14 is opposed to the first side portion lf14. Hereinafter, the shape of the second side portion lb14 and the shape of the first side portion lf14 are symmetrical in the front and back, so the description of the shape of the second side portion lb14 is omitted.

The center portion ld14 is provided on the left surface, the right surface, and the bottom surface of the left side of the frame portion 112*b*. Part of the center portion ld14 is embedded in the left side of the frame portion 112*b*. The center portion ld14 connects with the right end of the bottom portion first part Pp14. The center portion ld14 extends in the downward direction from the right end of the bottom portion first part Pp14.

As shown in FIG. 9, the side metal film cn1 covers part of the side surface SF1. Specifically, the side metal film cn1 covers part of the front surface of the first side portion second part Qr14. In this case, the side metal film cn1 is located in front of the first side portion lf14. Wettability of solder on the side metal film cn1 is higher than wettability of solder on the surface of the metal plating applied to the first side portion lf14. In other words, wettability of solder on the side metal film cn1 is higher than wettability of solder on part of the side surface SF1, other than the side metal film cn1. For example, the material of the side metal film cn1 is a metal material, such as gold (Au). The material of the metal plating is a metal material, such as nickel (Ni), as described above. Wettability of solder on the surface of gold is higher than wettability of solder on the surface of nickel.

As shown in FIG. 10, the side metal film cn2 covers part of the side surface SF2. Specifically, the side metal film cn2 covers part of the rear surface of the second side portion lb14. In this case, the side metal film cn2 is located in back of the second side portion lb14. Wettability of solder on the side metal film cn2 is higher than wettability of solder on the surface of the metal plating applied to the second side portion lb14. In other words, wettability of solder on the side metal film cn2 is higher than wettability of solder on part of the side surface SF2, other than the side metal film cn2. The material of the side metal film cn2 is, for example, a metal material, such as gold (Au).

As shown in FIG. 10, the bottom metal film cn3 covers part of the bottom surface SF3. Specifically, the bottom metal film cn3 covers part of the top surface of the bottom portion fourth part Sp14. In this case, the bottom metal film cn3 is located on the bottom portion fourth part Sp14. The bottom metal film cn3 extends in the right and left direction. Therefore, the bottom metal film cn3 extends in the X-axis direction. Specifically, the length of the bottom metal film cn3 in the X-axis direction is greater than the length of the bottom metal film cn3 in the Y-axis direction.

Wettability of solder on the bottom metal film cn3 is higher than wettability of solder on the surface of the metal plating. In other words, wettability of solder on the bottom metal film cn3 is higher than wettability of solder on part of the bottom surface SF3, other than the bottom metal films cn3, cn4. For example, the material of the bottom metal film cn3 is a metal material, such as gold (Au). The material of the metal plating is a metal material, such as nickel (Ni), as described above. Wettability of solder on the surface of gold is higher than wettability of solder on the surface of nickel.

As shown in FIG. 10, the bottom metal film cn4 covers part of the bottom surface SF3. Specifically, the bottom metal film cn4 covers part of the top surface of the bottom portion second part Qp14. Wettability of solder on the bottom metal film cn4 is higher than wettability of solder on part of the bottom surface SF3, other than the bottom metal films cn3, cn4. The material of the bottom metal film cn4 is, for example, a metal material, such as gold (Au).

As shown in FIG. 11, the side metal film cn1 is located on the right side with respect to the bottom metal film cn3. Specifically, a region Ar1 between both ends of the side metal film cn1 in the right and left direction is defined. A region between both ends of the bottom metal film cn3 in the right and left direction is defined as Ar2. The region Ar1 and the region Ar2 are arranged with a gap in this order in the rightward direction. In other words, in the right and left direction, the region Ar1 is present at a location different from that of the region Ar2. In this case, the region Ar1 between both ends of the side metal film cn1 in the right and left direction does not overlap, on an axis parallel to the right and left direction, the region Ar2 between both ends of the bottom metal film cn3 in the right and left direction. In other words, the region between both ends of the side metal film cn1 in the X-axis direction does not overlap, on the X-axis, the region between both ends of the bottom metal film cn3 in the X-axis direction. That is, an entirety of the region Ar1 between both ends of the side metal film cn1 in an X-axis direction is offset, along a Y-axis direction, from an entirety of the region Ar2 between both ends of the bottom metal film cn3 in the X-axis direction.

In this case, a region (not shown) between both ends of the side metal film cn2 in the right and left direction does not overlap, on an axis parallel to the right and left direction, a region (not shown) between both ends of the bottom metal film cn4 in the right and left direction. In other words, the region between both ends of the side metal film cn2 in the X-axis direction does not overlap, on the X-axis, the region between both ends of the bottom metal film cn4 in the X-axis direction.

As shown in FIG. 11, in the front and rear direction, the region Ar3 is present at a location different from that of the region Ar4. Specifically, the bottom metal film cn3 is located in back of the side metal film cn1. More specifically, the region Ar3 between both ends of the bottom metal film cn3 in the front and rear direction is defined. In addition, the region Ar4 between both ends of the side metal film cn1 in the front and rear direction is defined. The region Ar3 and the region Ar4 are arranged with a gap in this order in the forward direction. In other words, the region Ar3 between both ends of the bottom metal film cn3 in the Y-axis direction on the Y-axis and the region Ar4 between both ends of the side metal film cn1 in the Y-axis direction on the Y-axis are arranged in this order in the negative direction of the Y-axis. The region Ar3 between both ends of the bottom metal film cn3 in the Y-axis direction does not overlap, on the Y-axis, the region Ar4 between both ends of the side metal film cn1 in the Y-axis direction. In other words, an entirety of the region Ar3 between both ends of the bottom metal film cn3 in the Y-axis direction is offset, along the Y-axis direction, from an entirety of the region Ar4 between both ends of the side metal film cn1 in the Y-axis direction As shown in FIG. 12, part of the first side portion lf14 is located above the bottom portion 1114. More specifically, of two sides of the first side portion lf14, arranged in the up and down direction, the side located in the upward direction is defined as a side portion first side Edlf. In other words, of two sides of the first side portion lf14, arranged in the Z-axis direction, the side located in the positive direction of the Z-axis is defined as the side portion first side Edlf.

The bottom portion 1114 is connected to part of the side portion first side Edlf. At this time, part of the side portion first side Edlf, not connected to the bottom portion 1114, is located below the top surface SF4 of the bottom portion 1114. In other words, part of the side portion first side Edlf, not connected to the bottom portion 1114, is located in the negative direction of the Z-axis with respect to the top surface SF4 of the bottom portion 1114. In the present embodiment, the right part of the first side portion lf14 is located above the top surface SF4 of the bottom portion 1114.

As shown in FIG. 12, the first side portion lf14 has a notch Nt. In the present embodiment, the notch Nt has a U-shape when viewed in the front and rear direction. The notch Nt extends in the downward direction from the side portion first side Edlf. In other words, the notch Nt extends in the negative direction of the Z-axis from the side portion first side Edlf.

The structure of the ground terminal **114*r* and the structure of the ground terminal 114*l* are bilaterally symmetrical, so the description of the structure of the ground terminal 114*r*** is omitted.

A boundary BD between the side surface SF1 and the bottom surface SF3 is, for example, as follows. A normal vector HB of the side surface SF1 and the bottom surface SF3 of the ground terminal **114*l* is defined (see FIG. 9). The boundary BD is a part where an angle formed between the normal vector HB and a straight line parallel to the front and back direction is 45 degrees in an area in which the first side portion lf14 and the bottom portion 1114 are connected. In this case, the angle of a corner formed by the normal vector HB of the side surface SF1 and the straight line parallel to the front and back direction is smaller than 45 degrees. On the other hand, the angle of a corner formed by the normal vector HB of the bottom surface SF3** and the straight line parallel to the front and back direction is larger than 45 degrees.

Structure of Connector Set

Figure 13:
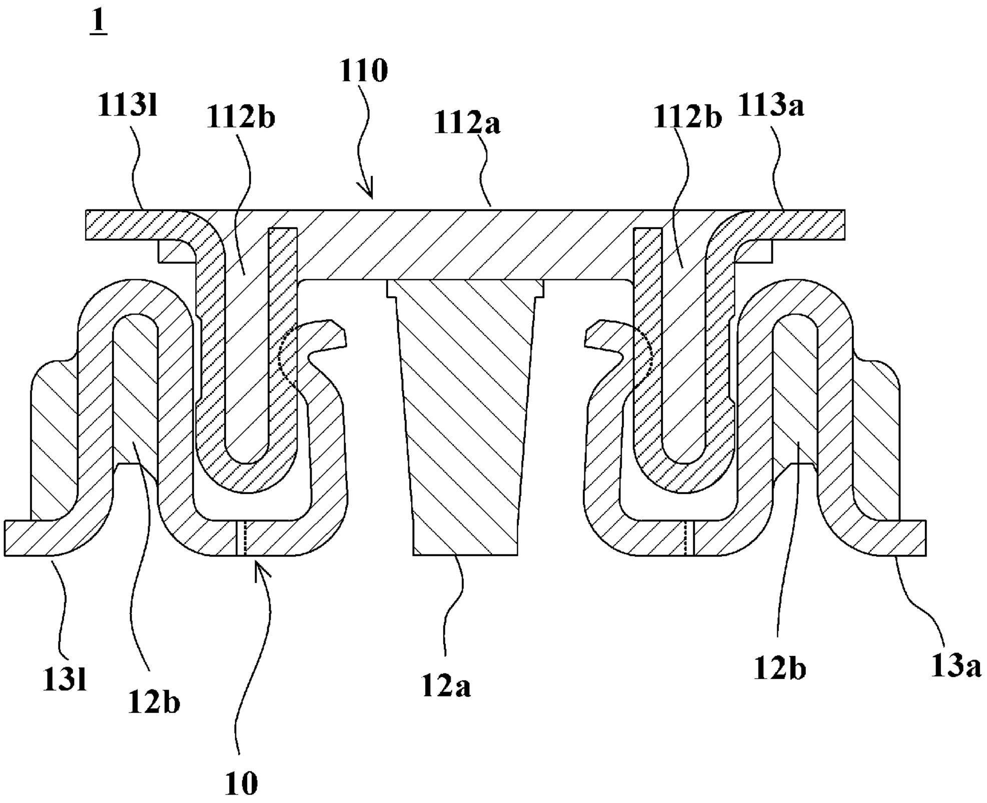
FIG. 13 is a cross-sectional view taken along the line A-A in FIG. 1.

Next, the structure of the connector set 1 will be described. FIG. 13 is a cross-sectional view taken along the line A-A in FIG. 1.

As shown in FIGS. 1 and 13, the frame portion **112*b* of the second connector 110 is inserted in a region surrounded by the frame portion 12*b* of the first connector 10. At this time, the protruding portion 12*a* of the first connector 10 is inserted in a region surrounded by the frame portion 112*b* of the second connector 110. Thus, the signal terminals 13*a* to 13*v* respectively contact with the signal terminals 113*a* to 113*v*. The ground terminals 141, 14*r* respectively contact with the ground terminals 114*l*, 114*r*. Furthermore, the ground terminals 16*a*, 16*b* contact with the ground terminal 114*l*. Specifically, the ground terminal 16*a* contacts with the side metal film cn1. The ground terminal 16*b* contacts with the side metal film cn2. The ground terminals 16*c*, 16*d* contact with the ground terminal 114*r***.

However, the floating terminals 151, **15*r* do not contact with the signal terminals 113*a* to 113*v* or the ground terminals 114*l*, 114*r*. Thus, in a state where the second connector 110 is connected to the first connector 10 as well, the potential of each of the floating terminals 151, 15*r*** remains at a floating potential.

The ground terminal **114*l* is mounted on the circuit board (not shown). Specifically, the bottom metal films cn3, cn4 are fixed to the electrodes of the circuit board by solder. Therefore, solder (hereinafter, referred to as first solder) is applied to the bottom metal films cn3, cn4**.

Advantageous Effects

With the second connector 110, the second connector 110 can be configured as a low profile. More specifically, as shown in FIG. 11, in the second connector 110, since the region Ar1 between both ends of the side metal film cn1 in the X-axis direction does not overlap, on the X-axis, the region Ar2 between both ends of the bottom metal film cn3 in the X-axis direction, the second connector 110 can be configured as a low profile. Hereinafter, a connector (hereinafter, referred to as a first comparative example) in which a region between both ends of a side metal film in the X-axis direction overlaps, on the X-axis, a region between both ends of a bottom metal film in the X-axis direction and the second connector 110 will be described by comparison.

In the first comparative example, first solder spreads out on the surface of the bottom metal film. At this time, the first solder having spread out on the surface of the bottom metal film can further spread out to around the bottom metal film. The bottom surface of the bottom portion and the side surface of the first side portion are connected. Therefore, the first solder having spread out to around the bottom metal film may reach the side surface of the first side portion. Here, wettability of solder on part of the side surface, other than the side metal film, is lower than wettability of solder on the side metal film. Therefore, the first solder is difficult to flow on the surface of part of the side surface, other than the side metal film. For this reason, excessive wetting of the first solder on the side surface is prevented. Thus, the possibility that the first solder to be applied to the bottom metal film contacts with the side metal film reduces. As a result, the first solder does not interfere with the contact between the ground terminal of the first connector and the side metal film.

However, when the first comparative example has a low-profile configuration, the length of the first side portion in the Z-axis direction is short. In other words, the length, in the Z-axis direction, of part of the side surface, other than the side metal film, is short. Therefore, a distance between the bottom metal film and the side metal film is reduced as compared to a non-low-profile configuration. In this case, the length, in the Z-axis direction, of a part where wettability of solder is low shortens. For this reason, the first solder applied to the bottom metal film more easily reaches the side metal film cn1 beyond part of the side surface, other than the side metal film. Therefore, the possibility that the first solder applied to the bottom metal film contacts with the side metal film increases. In this case, the first solder interferes with the contact between the ground terminal of the first connector and the side metal film. Therefore, to prevent interference with the contact between the ground terminal of the first connector and the side metal film by the first solder, the first comparative example is not allowed to have a low-profile configuration.

On the other hand, in the second connector 110, the region between both ends of the side metal film cn1 in the X-axis direction does not overlap, on the X-axis, the region between both ends of the bottom metal film cn3 in the X-axis direction. In this case, as compared to the comparative example, the distance between the side metal film cn1 and the bottom metal film cn3 extends. Therefore, the first solder applied to the bottom metal film cn3 is difficult to reach the side metal film cn1 beyond part of the side surface SF1, other than the side metal film cn1. For this reason, the first solder applied to the bottom metal film cn3 is difficult to contact with the side metal film cn1. As described above, even when the second connector 110 has a low-profile configuration, the first solder is difficult to contact with the side metal film cn1. In other words, the second connector 110 including the second connector 110 can be configured as a low profile.

Figure 14:
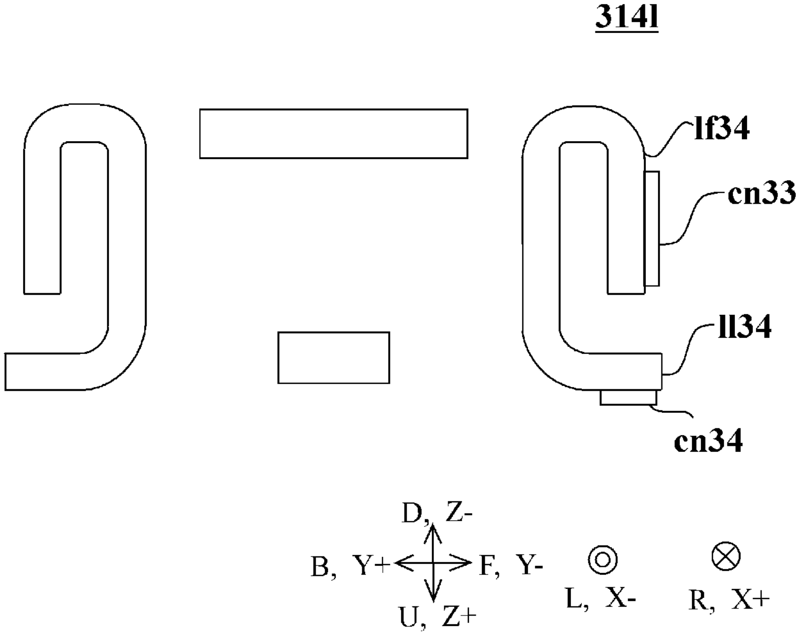
FIG. 14 is a view that shows a ground terminal according to a second comparative example.

With the second connector 110, resonance is difficult to occur in the second connector 110. Hereinafter, the second connector 110 and a connector according to a second comparative example will be described by comparison. FIG. 14 is a view that shows a ground terminal 3141 according to the second comparative example.

The connector according to the second comparative example includes the ground terminal 3141. As shown in FIG. 14, the ground terminal 3141 includes a first side portion lf34, a bottom portion 1134, a side metal film cn33, and a bottom metal film cn34. The first side portion lf34 is located under the bottom portion 1134. The side metal film cn33 covers part of the first side portion lf34. The bottom metal film cn34 covers part of the bottom portion 1134.

As shown in FIG. 14, in the second comparative example, the bottom portion 1134 and the first side portion lf34 are not connected. On the other hand, as shown in FIG. 10, in the ground terminal 114*l* of the second connector 110, the bottom portion 1114 and the first side portion lf14 are connected. In this case, the electrical length between the bottom portion 1114 and the first side portion lf14 in the ground terminal 114*l* is less than the electrical length between the bottom portion 1134 and the first side portion lf34 in the second comparative example. Thus, in comparison with the second comparative example, resonance is difficult to occur in the second connector 110.

In the second connector 110, the length of the bottom metal film cn3 in the X-axis direction is greater than the length of the bottom metal film cn3 in the Y-axis direction. In this case, the surface area of the bottom metal film increases. Thus, when the substrate of the second connector 110 is mounted, it is possible to increase the amount of solder to be applied to the bottom metal film cn3. Therefore, the fixation strength between the second connector 110 and the substrate increases.

With the second connector 110, the first solder to be applied to the bottom metal film cn3 is further difficult to contact with the side metal film cn1. More specifically, as shown in FIG. 12, the bottom portion 1114 has the top surface SF4 facing in the negative direction of the Z-axis. The bottom portion 1114 is connected to part of the side portion first side Edlf. Part of the side portion first side Edlf, not connected to the bottom portion 1114, is located in the negative direction of the Z-axis with respect to the top surface SF4 of the bottom portion 1114. In this case, part of the first side portion lf14 is not connected to the bottom portion 1114. Therefore, the first solder having wetted over the bottom metal film cn3 is difficult to reach the side metal film cn1. As a result, the first solder to be applied to the bottom metal film cn3 is difficult to contact with the side metal film cn1.

As shown in FIG. 11, in the second connector 110, the region Ar3 between both ends of the bottom metal film cn3 in the Y-axis direction does not overlap, on the Y-axis, the region Ar4 between both ends of the side metal film cn1 in the Y-axis direction. The region Ar3 between both ends of the bottom metal film cn3 in the Y-axis direction on the Y-axis and the region Ar4 between both ends of the side metal film cn1 in the Y-axis direction on the Y-axis are arranged in this order in the negative direction of the Y-axis. In this case, in comparison with the case where the region between both ends of the bottom metal film in the Y-axis direction overlaps, on the Y-axis, the region between both ends of the side metal film cn1 in the Y-axis direction, the distance between the side metal film cn1 and the bottom metal film cn3 in the front and rear direction extends. Therefore, solder to be applied to the side metal film cn1 and solder to be applied to the bottom metal film cn3 are further difficult to contact with each other.

As shown in FIG. 12, the first side portion lf14 has the notch Nt extending in the negative direction of the Z-axis from the side portion first side Edlf. In this case, in comparison with a ground terminal with no notch Nt, it is possible to extend the length of the electrical path between the bottom portion 1114 and the first side portion lf14 in the ground terminal 114*l*. In addition, when the first side portion lf14 has the notch Nt, a tester is able to easily check the inside of the second connector 110 during testing. Specifically, when the first side portion lf14 has the notch Nt, a tester is able to see the inside of the second connector 110 via the notch Nt.

Modification of Ground Terminal 114*l*

Figure 15:
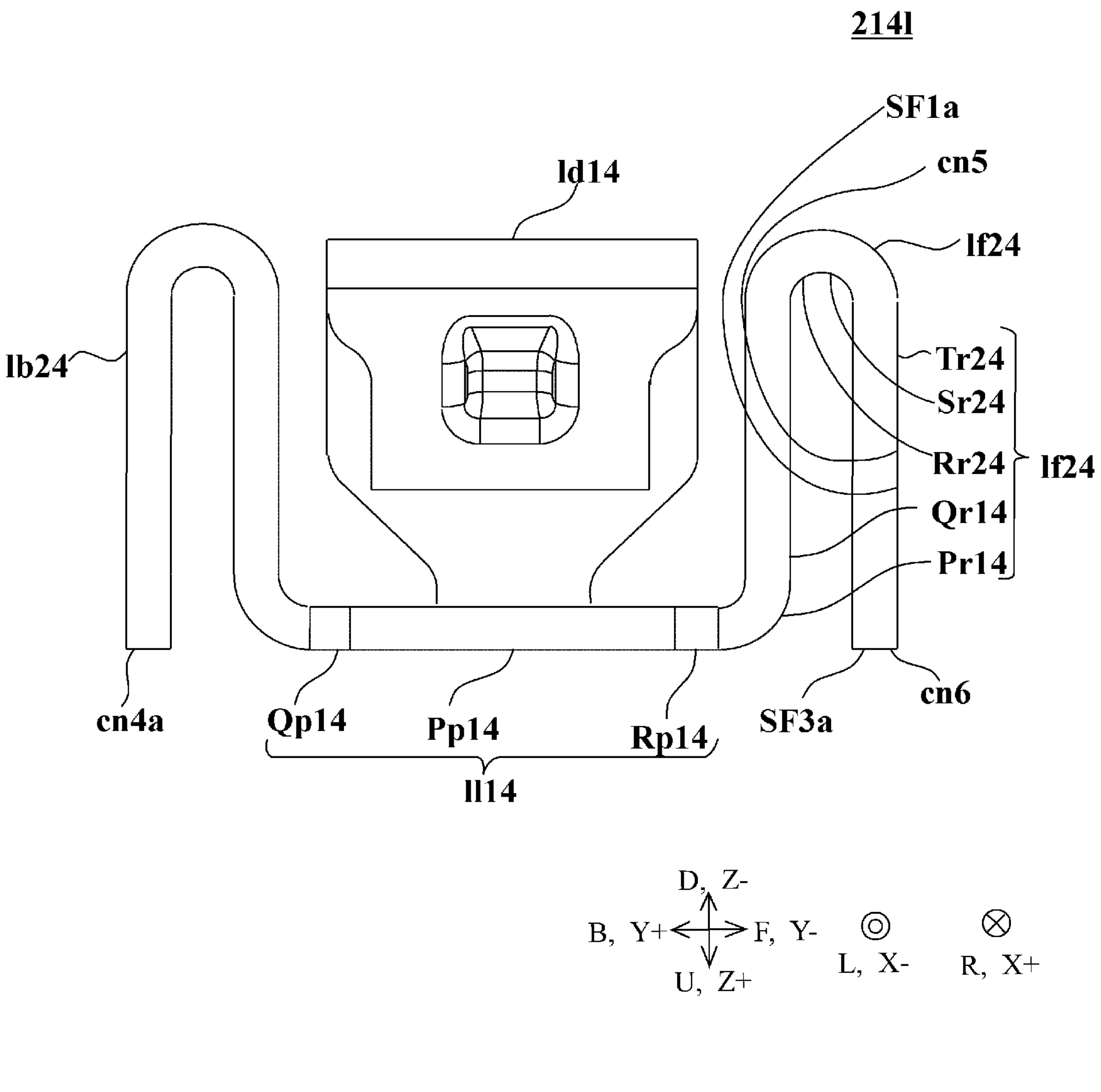
FIG. 15 is a view that shows a ground terminal according to a modification of the ground terminal.

Hereinafter, a ground terminal 214*l* according to a modification of the ground terminal 114*l* will be described with reference to the accompanying drawing. FIG. 15 is a view that shows the ground terminal 214*l* according to the modification of the ground terminal 114*l*. As shown in FIG. 15, the shape of the ground terminal 214*l* is different from the shape of the ground terminal 114*l*.

As shown in FIG. 15, the ground terminal 214*l* has a first side portion lf24 different in shape from the first side portion lf14 and a second side portion lb24 different in shape from the second side portion lb14.

The first side portion lf24 has a first side portion third part Rr24 different in shape from the first side portion third part Rr14. The first side portion lf24 has a first side portion fourth part Sr24 different from the first side portion fourth part Sr14. The first side portion lf24 has a first side portion fifth part Tr24 different from the first side portion fifth part Tr14. The first side portion third part Rr24 bends in the forward direction from the lower end of the first side portion second part Qr14. The first side portion fourth part Sr24 bends in the upward direction from the front end of the first side portion third part Rr24. The first side portion fifth part Tr24 extends in the upward direction from the upper end of the first side portion fourth part Sr24.

The first side portion fifth part Tr24 has a bottom surface SF3*a* exposed from the resin body member 112. Specifically, the bottom surface SF3*a* is exposed from the top surface of the resin body member 112. Specifically, the side surface SF1*a* is exposed from the front surface of the resin body member 112. The bottom surface SF3*a* and the side surface SF1*a* are connected.

The ground terminal 214*l* includes a side metal film cn5 and a bottom metal film cn6. The side metal film cn5 covers part of the side surface SF1*a*. Wettability of solder on the side metal film cn5 is higher than wettability of solder on part of the side surface SF1*a*, other than the side metal film cn5. The bottom metal film cn6 covers part of the bottom surface SF3*a*. Wettability of solder on the bottom metal film cn6 is higher than wettability of solder on part of the bottom surface SF3*a*, other than the bottom metal film cn6.

The structure of the second side portion lb24 and the structure of the first side portion lf24 are symmetrical in the front and back, so the description of the structure of the second side portion lb24 is omitted.

The first connector 10 including the ground terminal 214*l* provides the same advantageous effects as those of the first connector 10 including the ground terminal 114*l*.

OTHER EMBODIMENTS

The connector according to the present disclosure is not limited to the first connector 10 and may be changed within the scope of the purport of the present disclosure.

The ground terminals 14*r*, 16*a* to 16*d*, and the floating terminal 15*r* are not indispensable components.

In the specification, the annular shape is not limited to a complete ring and includes a partially cut-out ring. However, in the annular shape, the ratio of the cut-out part to the ring is lower than or equal to 20%.

The ground terminal 141 just needs to be opposed to the floating terminal 151 in the front and rear direction or in the right and left direction. Therefore, the ground terminal 141 may be configured so as to be opposed to the floating terminal 151 in the front and rear direction and not opposed to the floating terminal 151 in the right and left direction. The ground terminal 141 may be configured so as to be opposed to the floating terminal 151 in the right and left direction and not opposed to the floating terminal 151 in the front and rear direction.

The through-holes Hl, Hr do not need to be provided.

The ground protrusion 14*lf* and the floating protrusion 15*ld* are not indispensable components.

The floating terminals 151, 15*r* may be connected to the electrodes of the circuit board or may be configured not to be connected to the electrodes of the circuit board.

The first connector 10 may include any one of the set of signal terminals 13*a* to 13*k* and the set of signal terminals 131 to 13*v*.

The front and rear direction and the Y-axis direction do not necessarily need to coincide with each other, and the right and left direction and the X-axis direction do not necessarily need to coincide with each other. For example, it is applicable that the front and rear direction and the X-axis direction coincide with each other and the right and left direction and the Y-axis direction coincide with each other. Therefore, when, for example, the side surface SF1 faces in the leftward direction, the side surface SF1 may face in the negative direction of the Y-axis. In this case, a region between both ends of each of the side metal films cn1, cn2 in the front and rear direction is a region between both ends of the side metal film cn1, cn2 in the X-axis direction. Similarly, a region between both ends of each of the bottom metal films cn3, cn4 in the front and rear direction is a region between both ends of each of the bottom metal films cn3, cn4 in the X-axis direction. Therefore, even in the case described above, the region between both ends of each of the side metal films cn1, cn2 in the X-axis direction does not overlap, on the X-axis, the region between both ends of each of the bottom metal films cn3, cn4.

Similarly, the rightward direction and the positive direction of the X-axis do not necessarily need to coincide with each other, and the leftward direction and the negative direction of the X-axis do not necessarily need to coincide with each other. For example, it is applicable that the leftward direction and the positive direction of the X-axis coincide with each other and the rightward direction and the negative direction of the X-axis coincide with each other.

The up and down direction and the Z-axis direction do not necessarily need to coincide with each other.

Each of the bottom metal films cn3, cn4 does not necessarily need to extend in the X-axis direction.

The material of the metal plating does not necessarily need to be nickel.

The material of each of the side metal films cn1, cn2 does not necessarily need to be gold.

The material of each of the bottom metal films cn3, cn4 does not necessarily need to be gold.

The surface of the metal member does not necessarily need to be coated with metal plating.

The length of the bottom metal film cn3 in the X-axis direction does not necessarily need to be greater than the length of the bottom metal film cn3 in the Y-axis direction.

The first side portion lf14 does not necessarily need to have a notch Nt.

The notch Nt does not necessarily need to have a U-shape when viewed in the front and rear direction.

The region Ar3 between both ends of the bottom metal film cn3 in the Y-axis direction does not necessarily overlap, on the Y-axis, the region Ar4 between both ends of the side metal film cn1 in the Y-axis direction.

Part of the side portion first side Edlf, not connected to the bottom portion 1114, does not necessarily need to be located in the negative direction of the Z-axis with respect to the top surface SF4 of the bottom portion 1114.

The region Ar3 between both ends of the bottom metal film cn3 in the Y-axis direction on the Y-axis and the region Ar4 between both ends of the side metal film cn1 in the Y-axis direction on the Y-axis do not necessarily need to be arranged in this order in the negative direction of the Y-axis.

What is claimed is:

1. A connector comprising:

a resin body member;

a signal terminal supported by the resin body member; and a ground terminal supported by the resin body member, wherein the ground terminal includes a side portion having a side surface facing in a negative direction of a Y-axis, the side surface being exposed from the resin body member, a bottom portion having a bottom surface facing in a positive direction of a Z-axis, the bottom surface being exposed from the resin body member, a side metal film covering part of the side surface, and a bottom metal film covering part of the bottom surface, an entirety of a region between both ends of the side metal film in an X-axis direction is offset, along a Y-axis direction, from an entirety of a region between both ends of the bottom metal film in the X-axis direction, and the side surface and the bottom surface are connected.

2. The connector according to claim 1, wherein wettability of solder on the side metal film is higher than wettability of solder on part of the side surface, other than the side metal film, and wettability of solder on the bottom metal film is higher than wettability of solder on part of the bottom surface, other than the bottom metal film.

3. The connector according to claim 1, wherein a length of the bottom metal film in the X-axis direction is greater than a length of the bottom metal film in the Y-axis direction.

4. The connector according to claim 1, wherein the bottom portion has a top surface facing in a negative direction of the Z-axis, of two sides of the side portion, arranged in the Z-axis direction, the side located in the positive direction of the Z-axis is defined as a side portion first side, the bottom portion is connected to part of the side portion first side, and part of the side portion first side, not connected to the bottom portion, is located in the negative direction of the Z-axis with respect to the top surface of the bottom portion.

5. The connector according to claim 1, wherein an entirety of a region between both ends of the bottom metal film in the Y-axis direction is offset, along the Y-axis direction, from an entirety of a region between both ends of the side metal film in the Y-axis direction, and the region between both ends of the bottom metal film in the Y-axis direction on the Y-axis and the region between both ends of the side metal film in the Y-axis direction on the Y-axis are arranged in this order in the negative direction of the Y-axis.

6. The connector according to claim 1, wherein of two sides of the side portion, arranged in the Z-axis direction, the side located in the positive direction of the Z-axis is defined as a side portion first side, and the side portion has a notch extending from the side portion first side in a negative direction of the Z-axis.

7. The connector according to claim 2, wherein a length of the bottom metal film in the X-axis direction is greater than a length of the bottom metal film in the Y-axis direction.

8. The connector according to claim 2, wherein the bottom portion has a top surface facing in a negative direction of the Z-axis, of two sides of the side portion, arranged in the Z-axis direction, the side located in the positive direction of the Z-axis is defined as a side portion first side, the bottom portion is connected to part of the side portion first side, and part of the side portion first side, not connected to the bottom portion, is located in the negative direction of the Z-axis with respect to the top surface of the bottom portion.

9. The connector according to claim 3, wherein the bottom portion has a top surface facing in a negative direction of the Z-axis, of two sides of the side portion, arranged in the Z-axis direction, the side located in the positive direction of the Z-axis is defined as a side portion first side, the bottom portion is connected to part of the side portion first side, and part of the side portion first side, not connected to the bottom portion, is located in the negative direction of the Z-axis with respect to the top surface of the bottom portion.

10. The connector according to claim 7, wherein the bottom portion has a top surface facing in a negative direction of the Z-axis, of two sides of the side portion, arranged in the Z-axis direction, the side located in the positive direction of the Z-axis is defined as a side portion first side, the bottom portion is connected to part of the side portion first side, and part of the side portion first side, not connected to the bottom portion, is located in the negative direction of the Z-axis with respect to the top surface of the bottom portion.

11. The connector according to claim 2, wherein an entirety of a region between both ends of the bottom metal film in the Y-axis direction is offset, along the Y-axis direction, from an entirety of a region between both ends of the side metal film in the Y-axis direction, and the region between both ends of the bottom metal film in the Y-axis direction on the Y-axis and the region between both ends of the side metal film in the Y-axis direction on the Y-axis are arranged in this order in the negative direction of the Y-axis.

12. The connector according to claim 3, wherein an entirety of a region between both ends of the bottom metal film in the Y-axis direction is offset, along the Y-axis direction, from an entirety of a region between both ends of the side metal film in the Y-axis direction, and the region between both ends of the bottom metal film in the Y-axis direction on the Y-axis and the region between both ends of the side metal film in the Y-axis direction on the Y-axis are arranged in this order in the negative direction of the Y-axis.

13. The connector according to claim 4, wherein an entirety of a region between both ends of the bottom metal film in the Y-axis direction is offset, along the Y-axis direction, from an entirety of a region between both ends of the side metal film in the Y-axis direction, and the region between both ends of the bottom metal film in the Y-axis direction on the Y-axis and the region between both ends of the side metal film in the Y-axis direction on the Y-axis are arranged in this order in the negative direction of the Y-axis.

14. The connector according to claim 7, wherein an entirety of a region between both ends of the bottom metal film in the Y-axis direction is offset, along the Y-axis direction, from an entirety of a region between both ends of the side metal film in the Y-axis direction, and the region between both ends of the bottom metal film in the Y-axis direction on the Y-axis and the region between both ends of the side metal film in the Y-axis direction on the Y-axis are arranged in this order in the negative direction of the Y-axis.

15. The connector according to claim 8, wherein an entirety of a region between both ends of the bottom metal film in the Y-axis direction is offset, along the Y-axis direction, from an entirety of a region between both ends of the side metal film in the Y-axis direction, and the region between both ends of the bottom metal film in the Y-axis direction on the Y-axis and the region between both ends of the side metal film in the Y-axis direction on the Y-axis are arranged in this order in the negative direction of the Y-axis.

16. The connector according to claim 9, wherein an entirety of a region between both ends of the bottom metal film in the Y-axis direction is offset, along the Y-axis direction, from an entirety of a region between both ends of the side metal film in the Y-axis direction, and the region between both ends of the bottom metal film in the Y-axis direction on the Y-axis and the region between both ends of the side metal film in the Y-axis direction on the Y-axis are arranged in this order in the negative direction of the Y-axis.

17. The connector according to claim 2, wherein of two sides of the side portion, arranged in the Z-axis direction, the side located in the positive direction of the Z-axis is defined as a side portion first side, and the side portion has a notch extending from the side portion first side in a negative direction of the Z-axis.

18. The connector according to claim 3, wherein of two sides of the side portion, arranged in the Z-axis direction, the side located in the positive direction of the Z-axis is defined as a side portion first side, and the side portion has a notch extending from the side portion first side in a negative direction of the Z-axis.

19. The connector according to claim 4, wherein of two sides of the side portion, arranged in the Z-axis direction, the side located in the positive direction of the Z-axis is defined as a side portion first side, and the side portion has a notch extending from the side portion first side in a negative direction of the Z-axis.

20. The connector according to claim 5, wherein of two sides of the side portion, arranged in the Z-axis direction, the side located in the positive direction of the Z-axis is defined as a side portion first side, and the side portion has a notch extending from the side portion first side in a negative direction of the Z-axis.

* * * * *